US009760569B2

(12) United States Patent
Shin et al.

(10) Patent No.: US 9,760,569 B2
(45) Date of Patent: Sep. 12, 2017

(54) METHOD AND SYSTEM FOR PROVIDING TRANSLATED RESULT

(71) Applicant: NAVER CORPORATION, Seongnam-si, Gyeonggi-do (KR)

(72) Inventors: Joong-Hwi Shin, Seongnam-si (KR); Jin-I Park, Seongnam-si (KR); Jong-Hwan Kim, Seongnam-si (KR); Kyong-Hee Kwon, Seongnam-si (KR); Jun-Seok Kim, Seongnam-si (KR)

(73) Assignee: Naver Corporation, Gyeonggi-Do (KR)

( * ) Notice: Subject to any disclaimer, the term of this patent is extended or adjusted under 35 U.S.C. 154(b) by 0 days.

(21) Appl. No.: 14/680,184

(22) Filed: Apr. 7, 2015

(65) Prior Publication Data

US 2015/0286634 A1    Oct. 8, 2015

(30) Foreign Application Priority Data

Apr. 8, 2014    (KR) ........................ 10-2014-0041887

(51) Int. Cl.
*G06F 17/28* (2006.01)
*G06F 17/27* (2006.01)
*G06F 17/20* (2006.01)

(52) U.S. Cl.
CPC ........ *G06F 17/289* (2013.01); *G06F 17/2785* (2013.01)

(58) Field of Classification Search
CPC ...... G06F 17/27; G06F 17/28; G06F 17/2785; G06F 17/289
USPC ........................................ 704/2, 4, 5, 8, 275
See application file for complete search history.

(56) References Cited

U.S. PATENT DOCUMENTS

| 2009/0063126 | A1 | 3/2009 | Itagaki et al. |
| 2015/0199335 | A1* | 7/2015 | Choi ................... H04N 21/4668 704/8 |
| 2015/0227510 | A1* | 8/2015 | Shin ........................ G10L 15/04 704/2 |

FOREIGN PATENT DOCUMENTS

| CN | 102789451 | A |   | 11/2012 |
| JP | H0417065  | A |   | 1/1992  |
| JP | 5-128150  | A |   | 5/1993  |
| JP | H0844746  | A |   | 2/1996  |
| JP | 2004038406| A |   | 2/2004  |
| JP | 2008214320| A |   | 9/2008  |
| JP | 2011034171| A | * | 2/2011  |
| JP | 2012185654| A |   | 9/2012  |
| KR | 20100037813| A |  | 4/2010  |
| KR | 20120035244| A |  | 4/2012  |

(Continued)

OTHER PUBLICATIONS

Taiwanese Office Action dated Feb. 17, 2017 for corresponding TW Patent Application No. 1041098736.

(Continued)

*Primary Examiner* — Thierry L Pham
(74) *Attorney, Agent, or Firm* — Harness, Dickey & Pierce, P.L.C.

(57) ABSTRACT

Methods and/or systems for providing a translation result based on various semantic categories may be provided. A translation result providing method using a computer may include generating translations by translating a source sentence of a source language into a target language, and classifying the translations into semantic categories, respectively, and providing the classified translations to the user terminal.

16 Claims, 12 Drawing Sheets

(56) References Cited

FOREIGN PATENT DOCUMENTS

| TW | 201222282 A | 6/2012 |
|----|-------------|--------|
| TW | 201227359 A | 7/2012 |
| TW | 201235866 A | 9/2012 |

OTHER PUBLICATIONS

Japanese Office Action dated Nov. 1, 2016 for corresponding JP Application No. 2015-013224.
Chinese Office Action dated Apr. 24, 2017 for corresponding CN Application No. 201510028718.6.

\* cited by examiner

METHOD AND SYSTEM FOR PROVIDING TRANSLATED RESULT

CROSS-REFERENCE TO RELATED APPLICATION

This application claims priority from and the benefit of Korean Patent Application No. 10-2014-0041887, filed on Apr. 8, 2014, the entirety of which is hereby incorporated by reference for all purposes as if fully set forth herein.

BACKGROUND

1. Field

Example embodiments relate to machine translation technologies for generating a translation of a source sentence using a computer.

2. Description of the Background

With the recent increasing exchange of communication between nations, and development and expansion of an information technology (IT), the use of machine translation apparatuses for translating a sentence of a first language (e.g., a source language) to a sentence of a second language (e.g., a target language) is increasing. Generally, the machine translation apparatuses translate an input source sentence of one language to a sentence of another language through operations, which includes such as a morpheme analysis, a syntactic analysis, a conversion operation, and/or a generation operation, with respect to the input source sentence.

Machine translation methods according to the related art may include, for example, a direct method, a transfer method, and a pivot method based on an analysis level of a sentence. The direct method translates a sentence based on a direct correspondence between a source language and a target language, the transfer method translates a sentence through an operation of defining two intermediate expressions and performing an analysis, a conversion, and a generation operation with respect to each of the source language and the target language, and the pivot method translates a sentence through an analysis operation and a generation operation by defining a single neutral expression with respect to the source language and the target language.

Meanwhile, machine translation methods developed during the 1990s include, for example, a rule-based machine translation, a statistics-based machine translation, and a hybrid machine translation in which the rule-based machine translation and the statistics-based machine translation are combined. The machine translation methods may perform a translation based on knowledge or translation examples obtained from a previous translation process or statistics.

For example, Korean Laid-Open Publication No. 10-2010-0037813, published on Apr. 12, 2010, discloses a machine translation apparatus and method based on a statistical method that applies linguistic information to a statistical machine translation based on an analysis about a bilingual parallel corpus.

FIG. 1 illustrates an example of a probabilistic machine translation candidate according to a related art. Referring to FIG. 1, a probabilistic machine translation according to the related art generates a translation by measuring scores based on a word/sentence/rule of a translation candidate with respect to a source sentence, by combining corresponding candidates, and by sorting total scores of a sentence.

FIG. 2 illustrates an example of finding a correct path of translating a source sentence in German to a target sentence in English according to a related art. Referring to FIG. 2, corresponding candidates may be sorted and then displayed in descending order of probabilities.

As described above, the machine translation technology according to the related art generally considers information only regarding whether a translation of a source sentence is correct.

SUMMARY

According to some example embodiments, a translation result providing method and system may generate a candidate sentence to substitute a translation of a source sentence as a sentence in a complete form.

According to some example embodiments, a translation result providing method and system may generate a candidate sentence suitable for a semantic classification during a process of generating a candidate translation sentence.

According to some example embodiments, also provide a translation result providing method and system may generate a translation of a semantic category suitable for the purpose or personality of a user.

According to an example embodiment, a translation result providing method using a computer, the method includes generating translations by translating a source sentence of a source language into a target language, classifying the translations into semantic categories, respectively, and providing at least some of the classified translations as a translation result.

The classifying may include classifying the translations based on at least one of a writing style, a sentence structure, and a tense.

The generating may include sorting translations translated from the source sentence in order of scores measured using a machine translation model, and extracting two or more of the translations having relatively high scores, and the providing may include displaying the two or more of the translations as the translation result such that one of the two or more of the candidate sentences having highest scores is distinguished from the rest of the two or more of the translations.

The providing may include displaying the translations with respect to semantic categories, respectively.

The translation result providing method may further include receiving a selection of a user on one of the semantic categories with respect to the translation result. The providing may include displaying one of the translations classified into the semantic category selected by the user.

The translation result providing method may further include analyzing a sentence personality of a user who generated the source sentence. The providing may include displaying one of the translations classified into the semantic categories corresponding to the sentence personality of the user from among the semantic categories.

The translation result providing method may further include classifying the source sentence into one of the semantic categories. The providing may include displaying a translation, from among the classified translations, classified into one of the semantic categories, into which the source sentence is classified.

According to example embodiment, a translation result providing system includes a memory in which at least one program is loaded, and at least one processor. According to a control of the at least one program, the at least one processor is configured to perform processes including generating candidate sentences by translating a source sentence of a source language into a target language, and classifying the candidate sentences into semantic categories, respectively, and providing at least one of the classified candidate sentences as a translation result.

According to example embodiment, non-transitory computer-readable media storing instructions to control a computer system to provide a translation result. The instructions when executed may control the computer system to perform operations including generating translations by translating a source sentence of a source language into a target language, classifying the translations into semantic categories, respectively, and providing at least some of the classified translations as a translation result.

According to example embodiment, a file distribution system for distributing a file of an application installed in a user terminal includes a file transmitter configured to transmit the file in response to a request of the user terminal. The application may include a module configured to control the user terminal to transmit a source sentence of a source language to a machine translation server, and a module configured to control the user terminal to display at least some of translations generated by translating the source sentence into a target language. The machine translation server may be configured to classify the translations into semantic categories, and provide the classified translations to the user terminal.

It is to be understood that both the foregoing general description and the following detailed description are provided as examples and are intended to provide further explanation of the example embodiments as claimed.

BRIEF DESCRIPTION OF THE DRAWINGS

The accompanying drawings, which are included to provide a further understanding of the example embodiments and are incorporated in and constitute a part of this specification, illustrate example embodiments, and together with the description serve to explain the principles of example embodiments.

DETAILED DESCRIPTION

Figure 1:
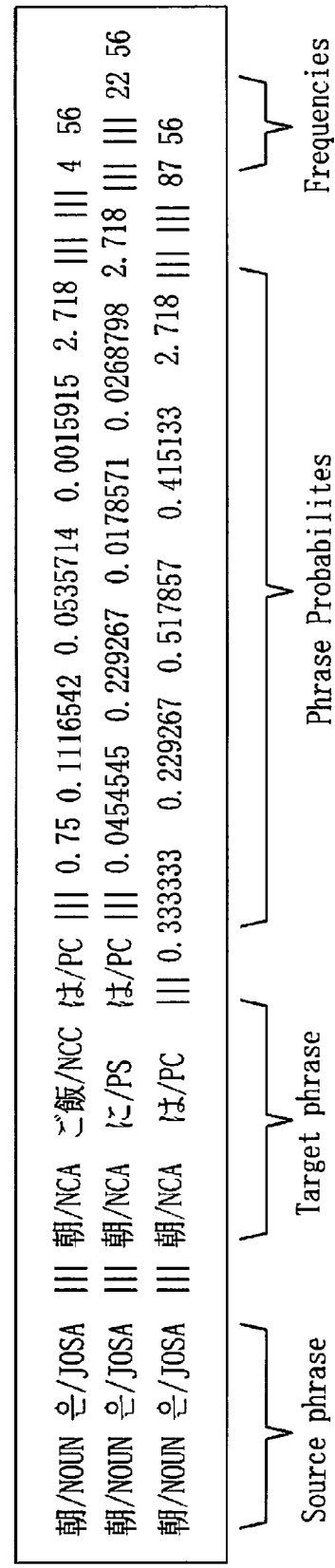
FIG. 1 illustrates an example describing a probabilistic machine translation candidate according to a related art.
Figure 2:
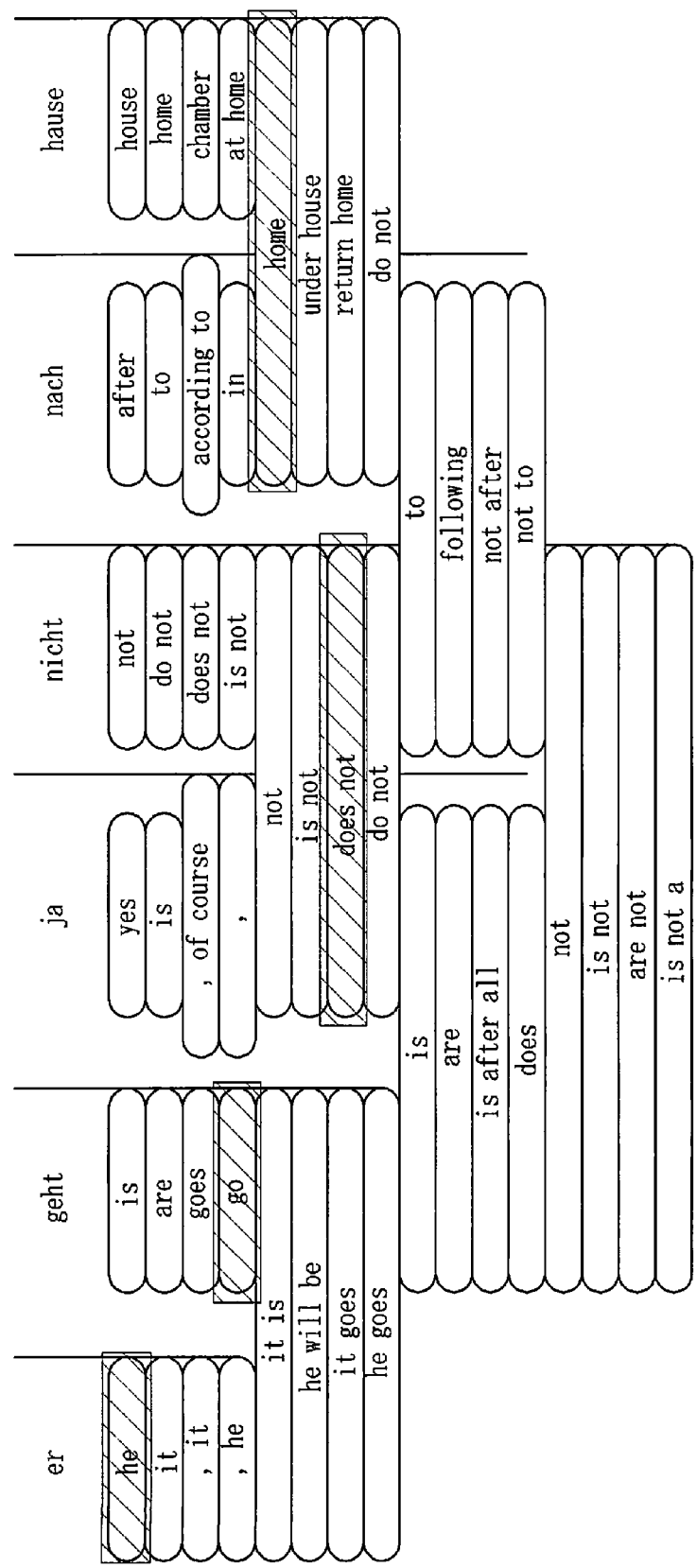
FIG. 2 illustrates an example of finding a correct path of translating a source sentence in German to a target sentence in English according to a related art.

Various example embodiments are described more fully hereinafter with reference to the accompanying drawings, in which the example embodiments are shown. Example embodiments may, however, be embodied in many different forms and should not be construed as limited to the example embodiments set forth herein. Rather, these example embodiments are provided so that this disclosure is thorough, and will fully convey the scope of example embodiments to those skilled in the art. In the drawings, the size and relative sizes of layers and areas may be exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described with reference to the accompanying drawings.

The example embodiments relate to machine translation technologies for automatically generating a translation of a source sentence using a computer.

Figure 3:
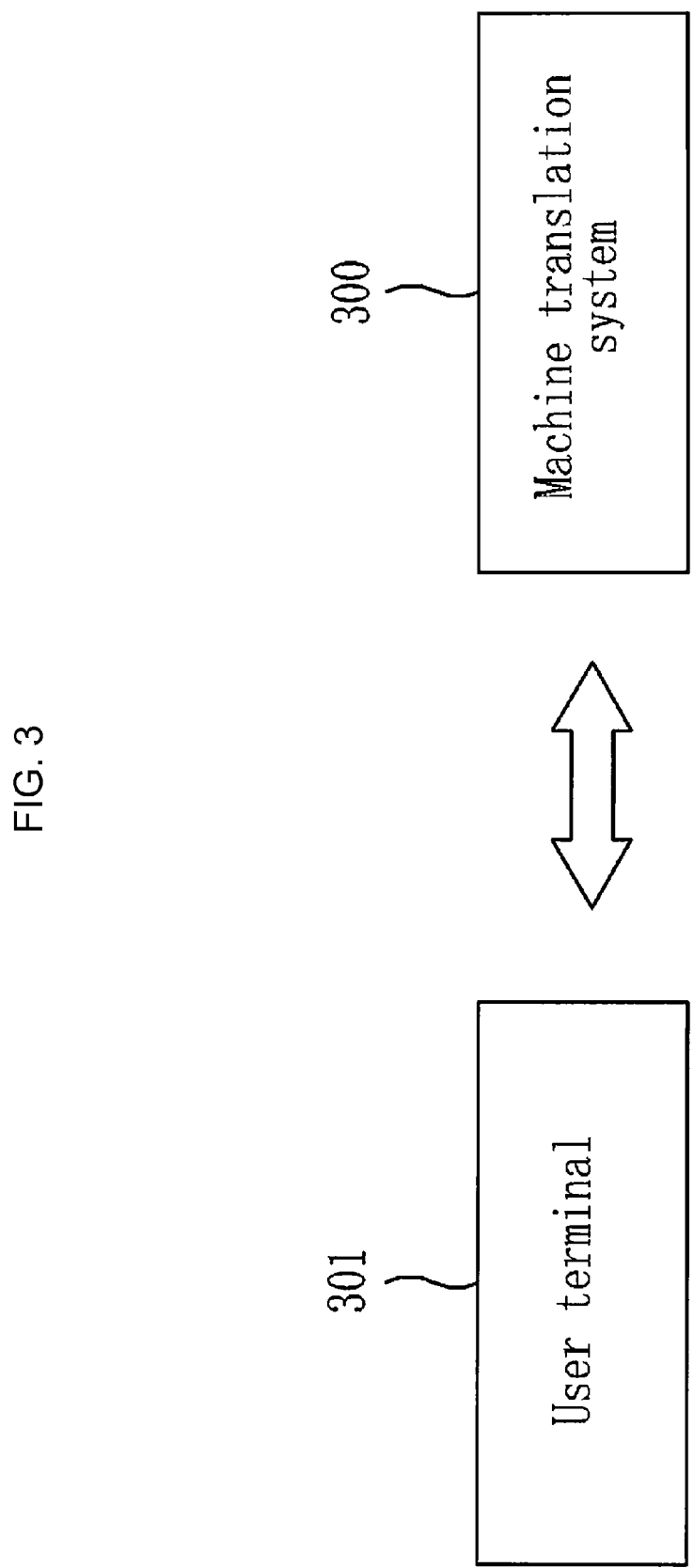
FIG. 3 is a diagram illustrating a relationship between a user terminal and a machine translation system according to an example embodiment.

FIG. 3 is a diagram illustrating a relationship between a user terminal and a machine translation system according to an example embodiment. FIG. 3 illustrates a user terminal 301 and a machine translation system 300. In FIG. 3, an indicator with a double arrow indicates that data may be transmitted and received between the user terminal 301 and the machine translation system 300 over a wired/wireless network.

The machine translation system 300 serves as a translation engine to translate a sentence of a source language (hereinafter, a source sentence) input from a user to candidate sentences of a target language (hereinafter, a translation), and to provide a translation result. In particular, the machine translation system 300 may provide the translation result by sorting candidate translation sentences with respect to the source sentence in order of scores, by extracting one or more candidate translation sentences (e.g., N candidate translation sentences), and by classifying the extracted candidate translation sentences based on a semantic category.

The user terminal 301 may refer to any type of terminal devices capable of connecting to a website/mobile site associated with the machine translation system 300. For example, the machine translation system 300 may include a personal computer (PC), a smartphone, a tablet, a laptop computer, a digital multimedia broadcasting (DMB) terminal, a portable multimedia player (PMP), and a navigation terminal, or installing and executing a service exclusive application. The user terminal 301 may perform the overall service operation (e.g., configuring a service screen, receiving data, performing a data transmission and reception, and/or storing data) under the control of the website/mobile site or the service exclusive application. The user terminal 102 may refer to any type of terminal devices, for example, a personal computer (PC), a smartphone, and a tablet, to input a source sentence to the machine translation system 300 and to output a translation result provided from the machine translation system 300. The user terminal 301 may include an input device to input the source sentence to the machine translation system 300 and an output device to output the translation result provided from the machine translation system 300. For example, the input device may be a keyboard, a mouse, a scanner, and a microphone, and the output device may be a monitor, a printer, and a speaker.

Figure 4:
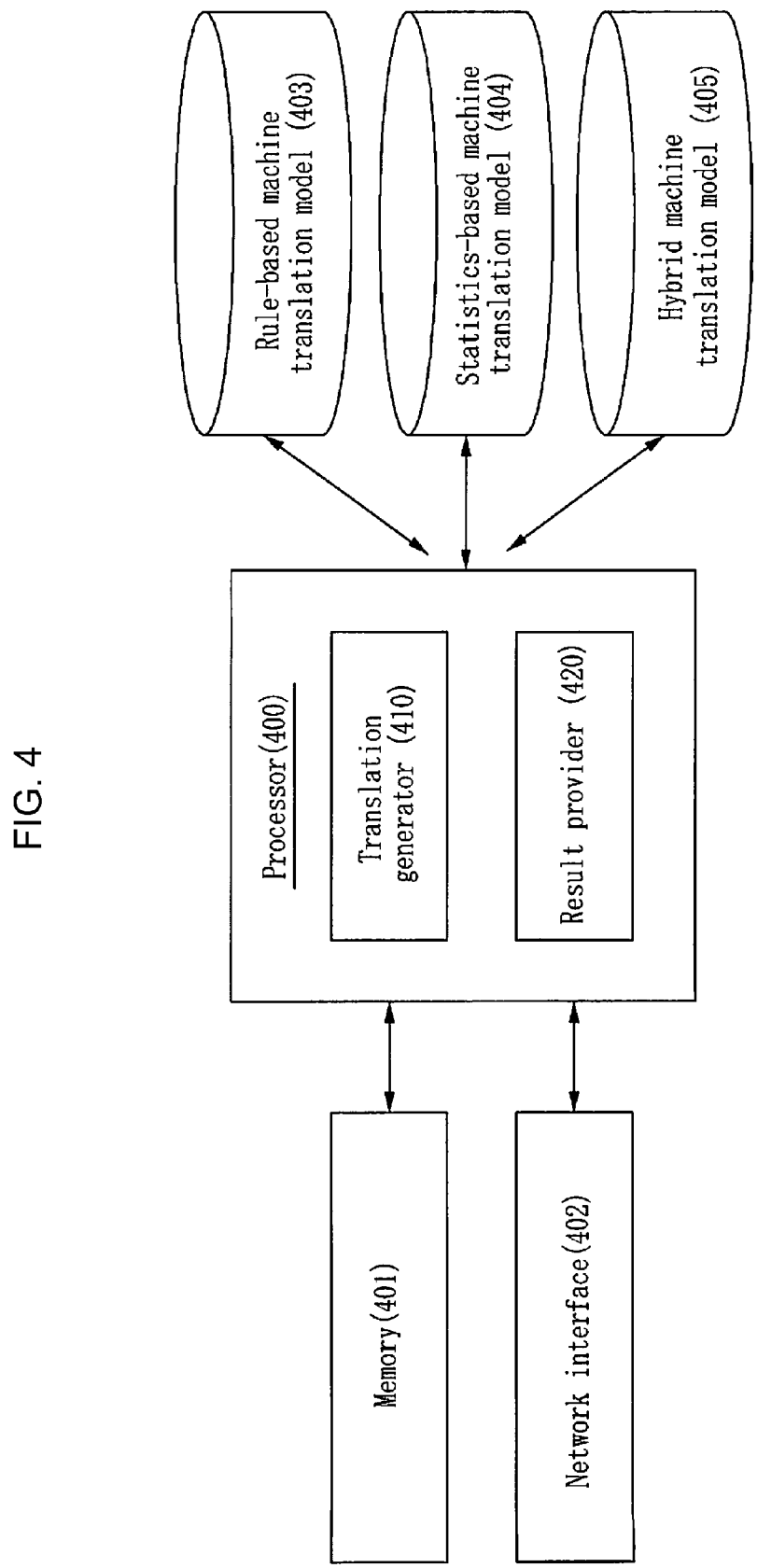
FIG. 4 is a block diagram illustrating a configuration of a machine translation system according to an example embodiment.

FIG. 4 is a block diagram illustrating a configuration of a machine translation system according to an example embodiment. Referring to FIG. 4, the machine translation system may include a processor 400 including a translation generator 410 and a result provider 420, a memory 401, and a network interface 402. The processor 400, according to a control of at least one program stored, for instance, in the memory 401 may be configured to perform processes including generating candidate sentences by translating a source sentence of a source language into a target language, classifying the candidate sentences into semantic categories, respectively, and providing at least one of the classified candidate sentences as a translation result. The machine translation system may include a database system associated with various translation models to automatically generate a translation from a source sentence. For example, the translation models for a machine translation may use a rule-based machine translation model 403, a statistics-based machine translation model 404, and a hybrid machine translation model 405 in which a rule-based method and a statistics-based method are combined.

The memory 401 may store a program including an instruction corresponding to a machine translation routine of generating a candidate translation sentence with respect to a source sentence, and classifying the candidate translation sentence into a corresponding semantic category. Processes performed by the machine translation system may be executed by the program stored in the memory 401. For example, the memory 401 may be a hard disk, a solid state disk (SSD), a secure digital (SD) card, and other storage media.

The network interface 402 may combine a network with the machine translation system for communication with user terminals using a semantic category-based machine translation service.

The processor 400 refers to an apparatus configured to perform processing in response to an instruction of the program stored in the memory 401, and may include a microprocessor such as a central processing unit (CPU). Hereinafter, a detailed configuration of the processor 400 will be described.

The translation generator 410 may generate a translation by applying, to the source sentence, a desired (or alternatively, predefined) machine translation model, for example, the rule-based machine translation model 403, the statistics-based machine translation model 404, and the hybrid machine translation model 405. For example, the translation generator 410 may generate candidate translation sentences as sentences of various semantic categories during a process of generating a translation of the source sentence. That is, the translation generator 410 may sort candidate sentences that are translated from a source sentence in order of scores, extract N candidate translation sentences, and classify the extracted candidate translation sentences into a corresponding semantic category. Here, the term "semantic category" may indicate all the criteria for classifying attributes of a sentence, which includes a writing style, a sentence structure, a tense, and/or a linguistic norm. For example, the semantic category may be classified into a literary style and a colloquial style based on the writing style, may be classified into a declarative sentence, a pleasant sentence, an imperative sentence, a honorific form, and a plain form based on the sentence structure, and may be classified into a past tense, a present tense, and a future tense based on the tense, and may be classified into a standard language and a dialect based on the linguistic norm.

The result provider 420 may provide a translation of the source sentence. For example, the result provider 420 may provide a translation result by including candidate translation sentences having similar meanings to each other. Here, providing candidate translation sentences refers to providing the candidate translation sentences in a complete sentence form instead of simply providing word candidates having similar meanings to each other. Thus, the candidate translation sentences may include, for example, a complete sentence in which words are replaced with other words having similar meanings and a complete sentence in which a word and a structure are differently configured. As an example of providing a translation result, the result provider 420 may classify and display candidate translation sentences with respect to respective semantic categories. As another example of providing a translation result, the result provider 420 may select and display candidate translation sentences classified based on a purpose of a user (e.g., a semantic category selected by the user). As still another example of providing a translation result, the result provider 420 may select and display candidate translation sentences classified into semantic categories suitable for an personality of a user. For example, the personality of the user may be analyzed from user information accumulated on the Internet. For example, a semantic category of a sentence predicted to be used by the user may be induced by analyzing a service type or a writing style frequently used by the user. As yet another example, the result provider 420 may select and display, from among candidate translation sentences of a source sentence, a sentence having a semantic category identical to the semantic category of the source sentence by automatically classifying the semantic category of the source sentence input from the user.

According to the above configuration, as expressed by Table 1, the machine translation system according to some example embodiments may provide sentences suitable for each semantic classification by generating or performing post-processing of the sentence, during a process of generating candidate translation sentences. In Tables 1 and 2, and throughout the specification, unless defined otherwise, the source sentence is written in English and translations are written in Korean.

TABLE 1

Source sentence  I just looking around.

Translations
(1) literary/honorific/present/formal/article:
그냥 둘러보고있습니다.
(2) literary/plain/past/novel:
그냥 둘러보았다.
(3) colloquial/honorific/will/future/conversation translation:
그저 구경 좀 하겠습니다.
(4) colloquial/plain/present/conversation:
그냥 둘러보겠어.
(5) colloquial/honorific/present/intimate/conversation:
그냥 둘러보는중이에요.
(6) colloquial/contracted (SNS style)/plain/will/future:
걍 볼께

Accordingly, during a process of generating candidate translation sentences of a machine translation, the machine translation system may classify the candidate translation sentences based on semantic categories and accordingly, may provide a translation suitable for the purpose or the personality of the user. For example, the machine translation system may generate translations of various semantic categories, for example, a literary sentence in a form of an article with respect to a source sentence of a news article and a colloquial sentence suitable for a conversion on an SNS (e.g., a messenger and a bulletin board).

Hereinafter, a semantic categorization method according to a configuration of a machine translation will be described in detail.

Rule-Based Machine Translation Model

A general rule-based machine translation method may generate a translation rule based on language information of a source language and a target language, and may generate a translation with respect to a source sentence based on the translation rule.

TABLE 2

| Source sentence (input sentence) | I drunk a cup of water. |
|---|---|
| Translation | 나는 물 한잔을 마셨다. |

Hereinafter, a rule-based translation generating process will be described with reference to an example of Table 2:
1. Generalization: [subject] [verb past tense] [object1] [object2].
2. Change of order: [subject] [object2] [object1] [verb past tense]
3. Apply characteristics of language: [subject] (은/는) [object2] (을/를) [object1] [verb past tense]
4. Apply translation rule: [나]는[물][한 잔]을[마셨다].

Accordingly, the machine translation system may generate a rule for each of various semantic categories and may generate a translation suitable for each semantic category. That is, the machine translation system may add translation rules corresponding to respective semantic categories to a translation rule of a general rule-based machine translation method.

Referring to Table 2, a translation rule corresponding to a semantic category may be applied to an inflection or may be applicable to the entire sentence. As a result, the following examples may be acquired:

Examples

Future tense rule: 나는 물 한 잔을 마실 것이다 (corresponding to "I will drink a cup of water").

Colloquial style rule: 나는 물 한 잔유 마셔요 (corresponding to "I'm drinking a cup of water").

Conversation style rule: 나 물 마셔 (corresponding to "I'm drinking water").

Contracted rule: 물 마셔 (corresponding to "drinking water").

A plurality of candidate sentences may be generated by applying a translation rule corresponding to each semantic category. Each of the generated candidate sentences may be classified into an appropriate semantic category.

Examples

나는 물 한 잔을 마실 것이다.→classified into a future tense.
나는 물 한 잔을 마셔요.→classified into a colloquial style.
나 물 마셔 →classified into a conversion style.
물 마셔 →classified into a contracted style.

Candidate translation sentences may be classified using a statistical method or a regular method.

The statistical method for classifying sentences refers to a method of statistically estimating meanings of sentences and classifying the sentences. For example, "d classifyicorresponding to "I ate a meal")" may be estimated to be probabilistically close to a literary style, and ""or exampcorresponding to "ate a meal")" may be estimated to be probabilistically close to a colloquial style.

The regular method for classifying sentences refers to a method of determining a semantic category of a sentence by semantically analyzing constituent elements of the sentence and then applying a corresponding rule. For example, the regular method may be expanded from a simple rule of classifying a sentence ending with "~ith to a colloquial style and classifying a sentence ending with "~th into a literary style, to various rules having a higher complexity.

Statistics-Based Machine Translation Model

A general statistics-based machine translation method may include a translation model constructing process, a language model constructing process, and a translation selecting process using a translation model and a language model.

A machine translation system may construct a translation probability table using translation pair data of different two languages, which are the subject languages for translation.

Figure 5:
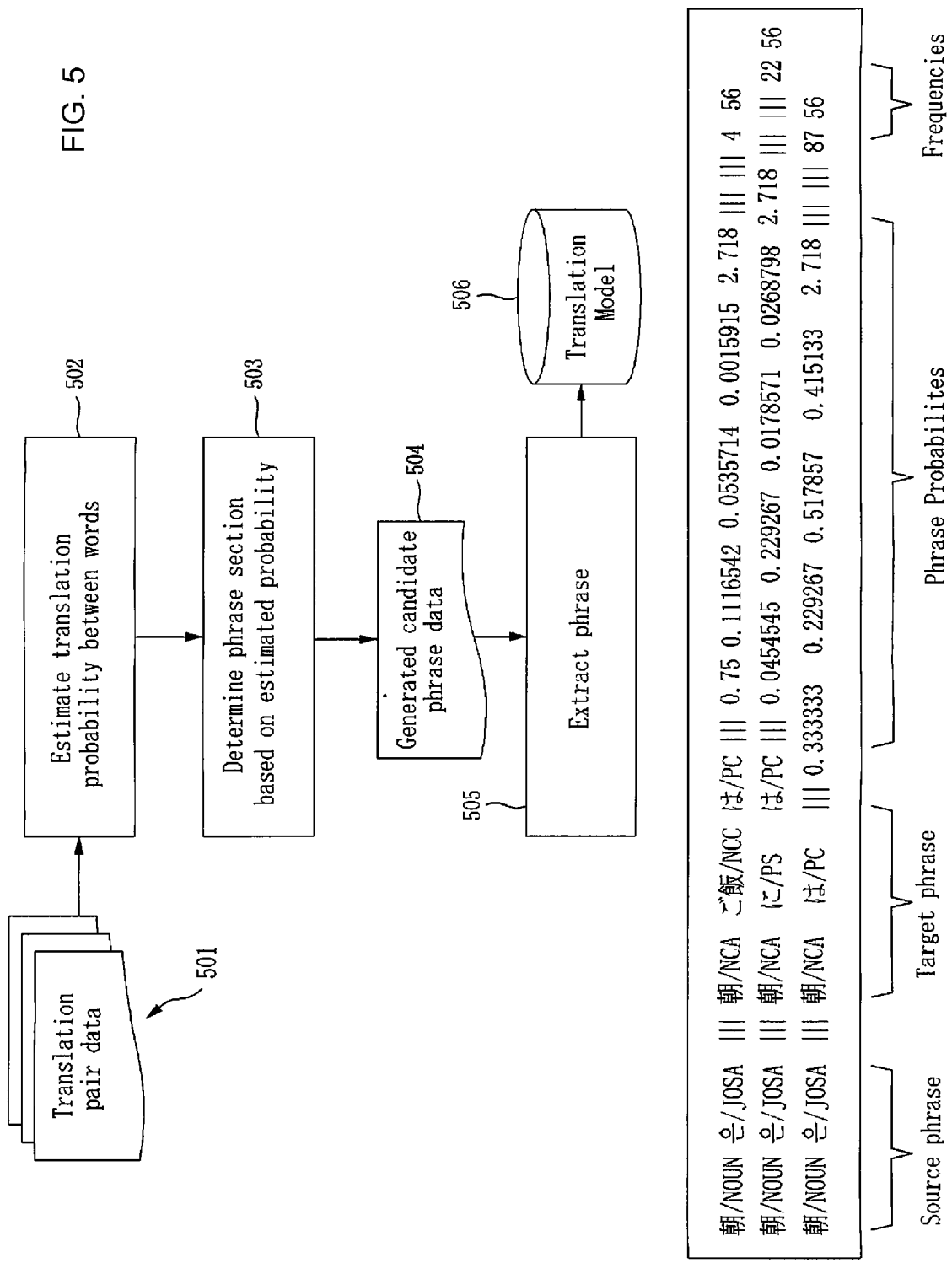
FIG. 5 illustrates a translation probability table constructing process for a statistics-based machine translation according to an example embodiment.

FIG. 5 illustrates a translation probability table constructing process for a statistics-based machine translation according to an example embodiment. As an example, referring to FIG. 5, a machine translation system may receive large translation pair data of two languages in operation 501, may estimate a translation probability between words from the large translation pair data in operation 502, and may determine a phrase section based on the estimated translation probability between words in operation 503. The machine translation system may generate candidate phrase data with respect to the determined phrase section in operation 504, may extract a phrase from the candidate phrase data in operation 505, and may construct a translation model including a translation probability table in operation 506.

The machine translation system may construct a probability list about a naturalness of a sentence by constructing a language model for each language based on large data of a corresponding language.

Figure 6:
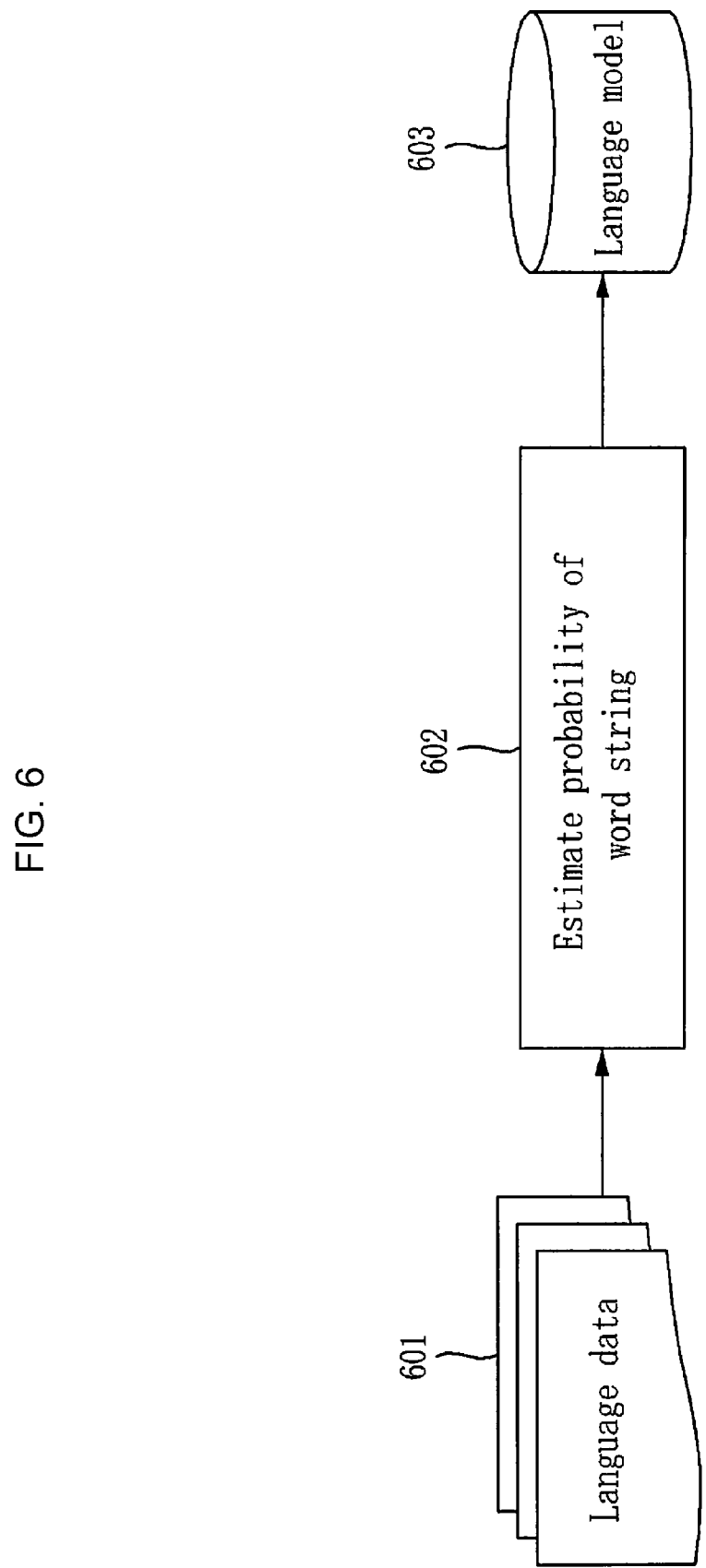
FIG. 6 illustrates a language model constructing process for a statistics-based machine translation according to an example embodiment.

FIG. 6 illustrates a language model constructing process for a statistics-based machine translation according to an example embodiment. As an example, referring to FIG. 6, a machine translation system may receive large data of a sentence written in a language in operation 601, may estimate and store a probability of a corresponding word string from the large data in operation 602, and may construct a language model indicating a probability list about a naturalness of a sentence in operation 603.

Next, the machine translation system may select a translation using a bilingual translation model and a monolingual language model.

Figure 7:
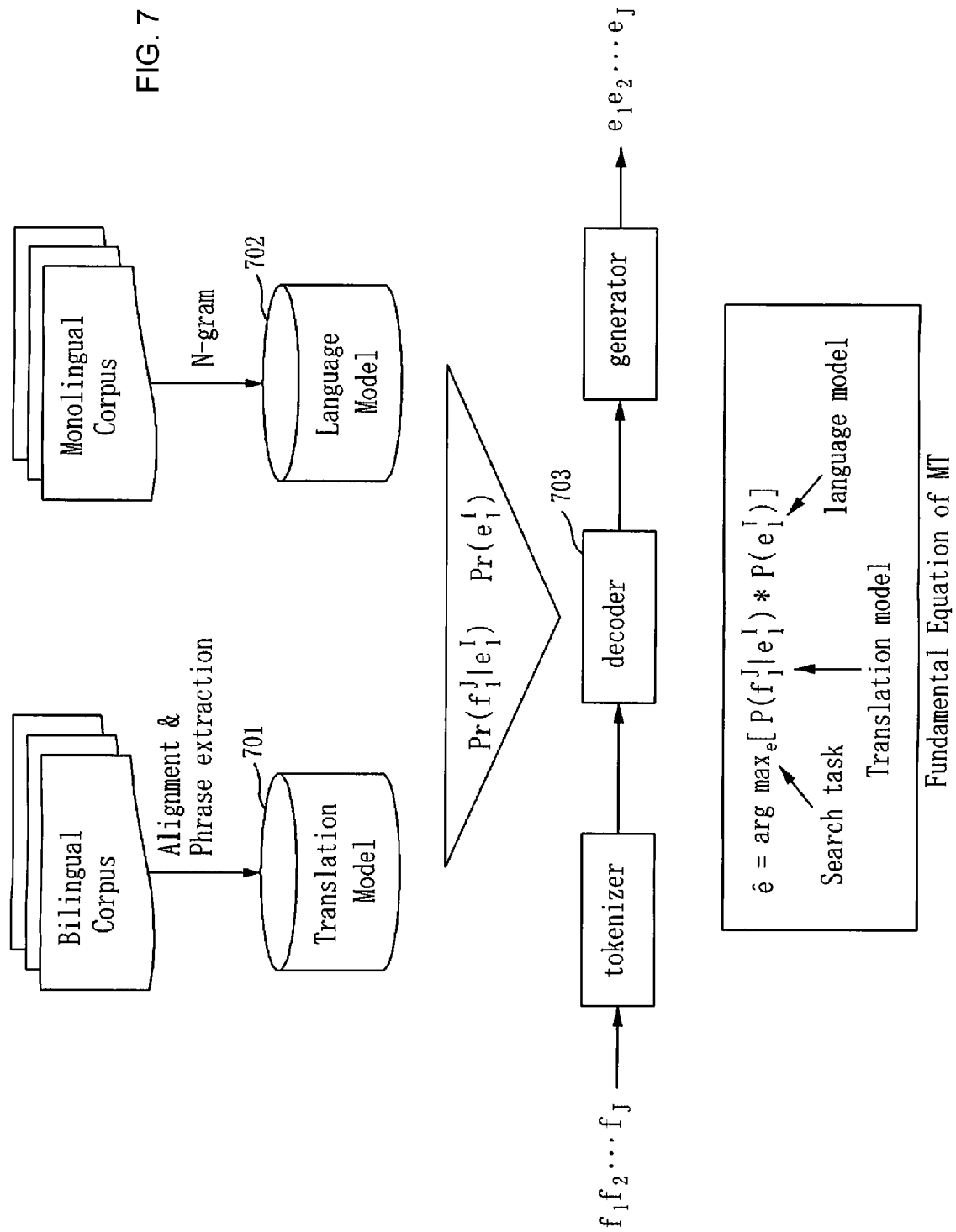
FIG. 7 is a diagram illustrating a translation selecting process using a translation model and a language model according to an example embodiment.
Figure 8:
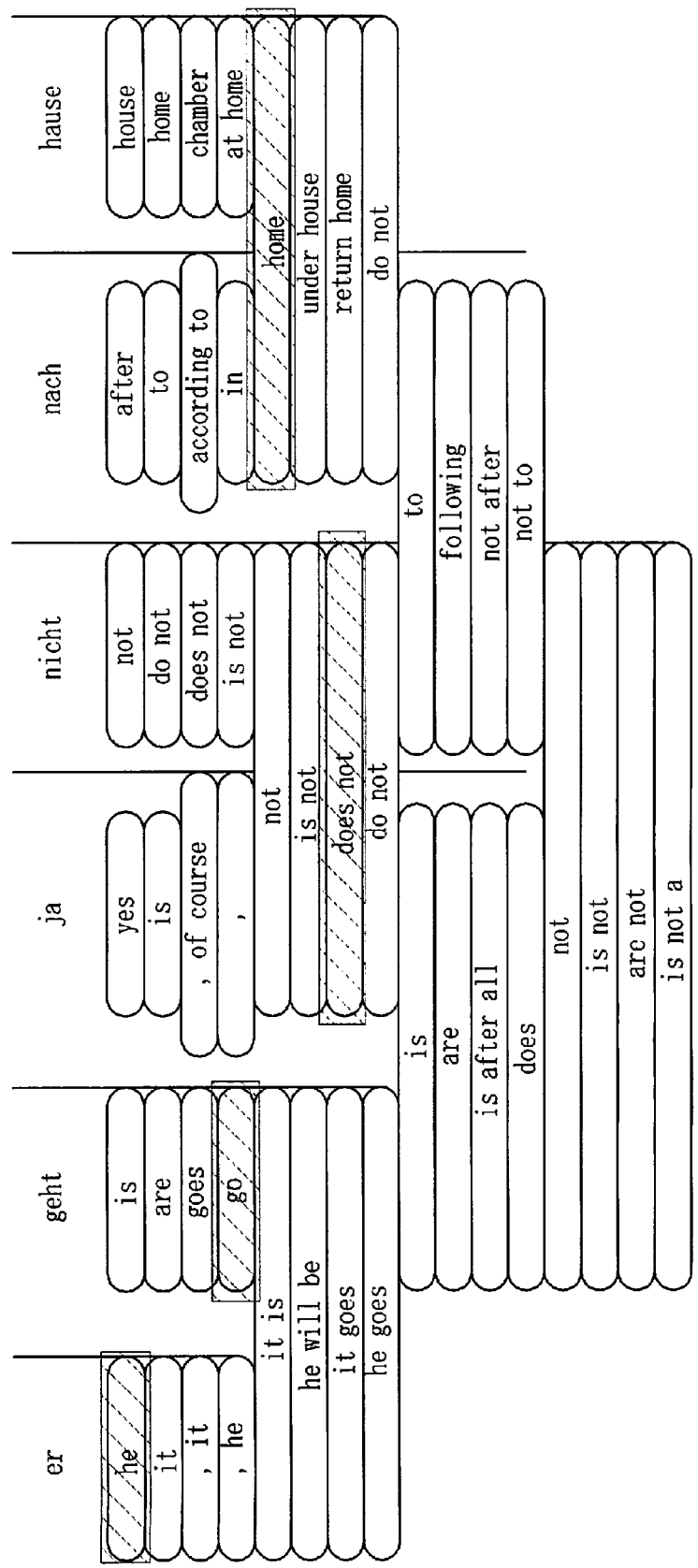
FIG. 8 illustrates a process of selecting a translation in English with respect to a source sentence in German, according to the translation selecting process of FIG. 7.

FIG. 7 is a diagram describing a translation selecting process using a translation model and a language model according to an example embodiment. As an example, referring to FIG. 7, a machine translation system may select an optimal candidate sentence from among a plurality of candidate translation sentences with respect to a source sentence using a translation model constructed from a bilingual corpus and a language model constructed from a monolingual corpus, through a decoder 703. FIG. 8 illustrates a process of selecting a translation in English with respect to a source sentence in German. Referring to FIG. 8, a merged sentence of shadowed columns indicates a sentence string of which a phrase probability in the translation model and a word string in the language model are simultaneously high.

The aforementioned statistics-based machine translation method may be applied to the candidate sentence generation technology proposed herein.

As an example, the machine translation system may sort candidate sentences translated from a source sentence in order of scores by applying a translation selecting method of a statistics-based machine translation and may extract N candidate sentences in descending order of scores. The machine translation system may classify the extracted N candidate sentences into appropriate semantic categories. Thus, a candidate sentence may be classified into an appropriate semantic category using the statistical method or the regular method.

Accordingly, the machine translation system may translate a source sentence to be probabilistically suitable for a semantic category by constructing language models suitable for respective semantic categories and by applying the constructed language models to a machine translation. The language models constructed with respect to respective semantic categories and applied to the machine translation function to generate a probabilistically natural sentence through a corpus including a large sentence. In this instance, the machine translation system may estimate a probability of a specific semantic category by selectively constructing a language model to be suitable for the specific semantic category. For example, once a probability table is generated by constructing a large corpus of twitter, a sentence of a twitter style is highly likely to be selected.

Hybrid Machine Translation Model

A general hybrid machine translation method refers to a method of appropriately applying the aforementioned rule-based machine translation method and statistics-based machine translation method. Similarly, the hybrid machine translation method may generate a plurality of candidate translation sentences with respect to a source sentence and may classify the candidate translation sentences into appropriate semantic categories, respectively.

In the machine translation method, a hybrid method of a rule-based method and a statistics-based method may be enabled. Accordingly, a method of selecting a candidate translation sentence based on a semantic category may also employ the hybrid method of the rule-based method and the statistics-based method.

For example, a machine translation system capable of performing a hybrid method (e.g., a combination of a rule-based method and a statistics-based method) may generate a plurality of candidate translation sentences based on various semantic categories during a process of generating a translation of a source sentence.

The machine translation system may provide a translation of a source sentence by including, in a translation result, a plurality of candidate sentences having the same or similar meanings. As an example, the machine translation system may sort a plurality of candidate sentences translated from a source sentence in order of scores, may extract N candidate sentences, and may display a translation result so that an optimal sentence having the highest scores may be distinguished from other candidate sentences. Further, the machine translation system may provide other candidate sentences in a complete sentence form by including the other candidate sentences in the translation result.

Figure 9:
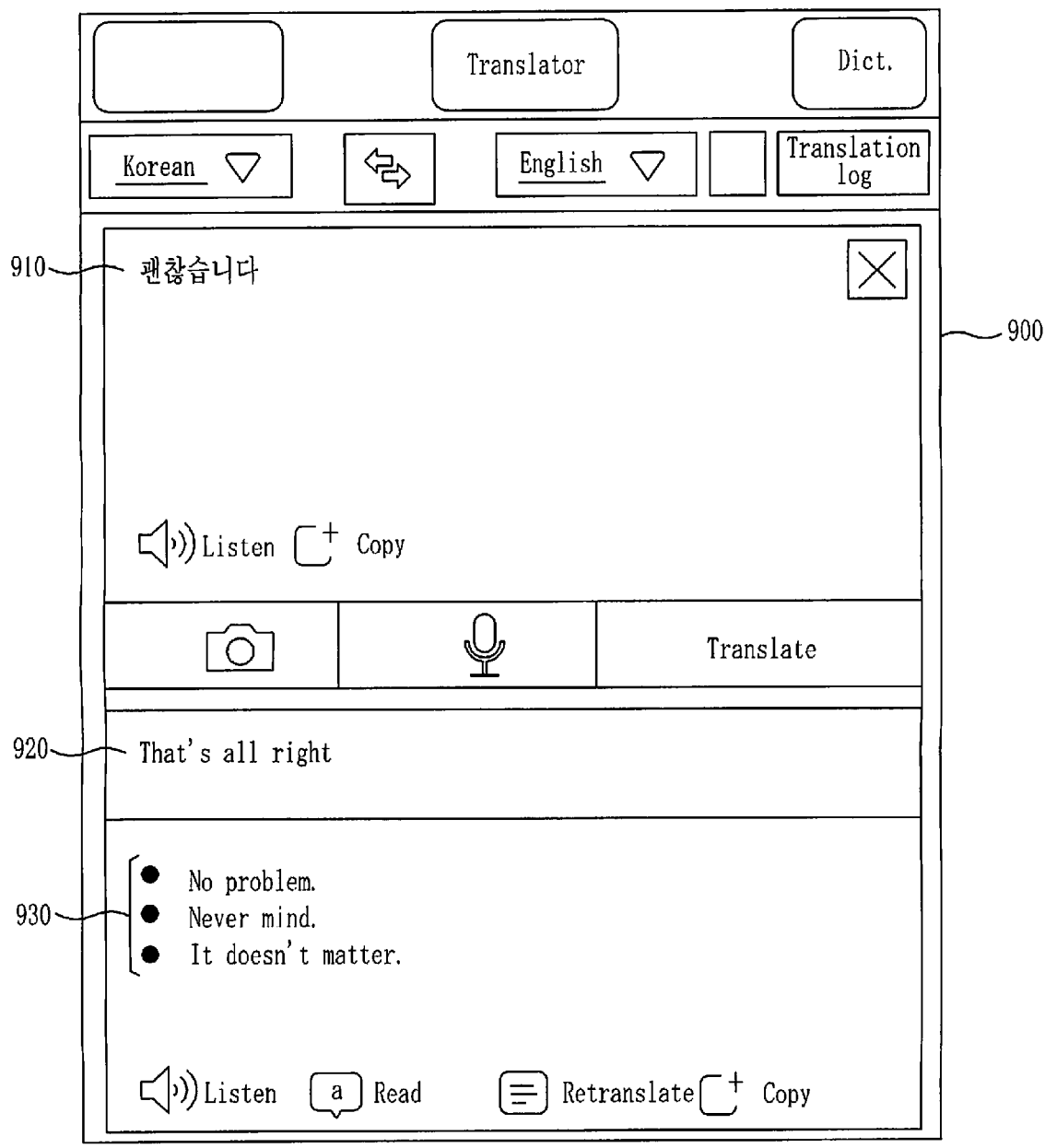
FIGS. 9 through 12 illustrate examples of a service screen for displaying translation candidate sentences classified based on a semantic category according to an example embodiment.

FIG. 9 illustrates an example of a translation result screen 900 for translating Korean to English according to an example embodiment. A machine translation system may display translations 920 and 930 translated in English as a translation result, in response to a source sentence "괜찮습니다" 910 to Korean. Here, as a translation result for the source sentence "괜찮습니다" 910, the machine translation system may classify and display the translation 920 corresponding to an optimal sentence (e.g., "That's all right" having the highest scores) and the translations 930 corresponding to candidate sentences (e.g., "No problem", "Never mind", and "It doesn't matter") having same or similar meanings to "That's all right".

Figure 10:
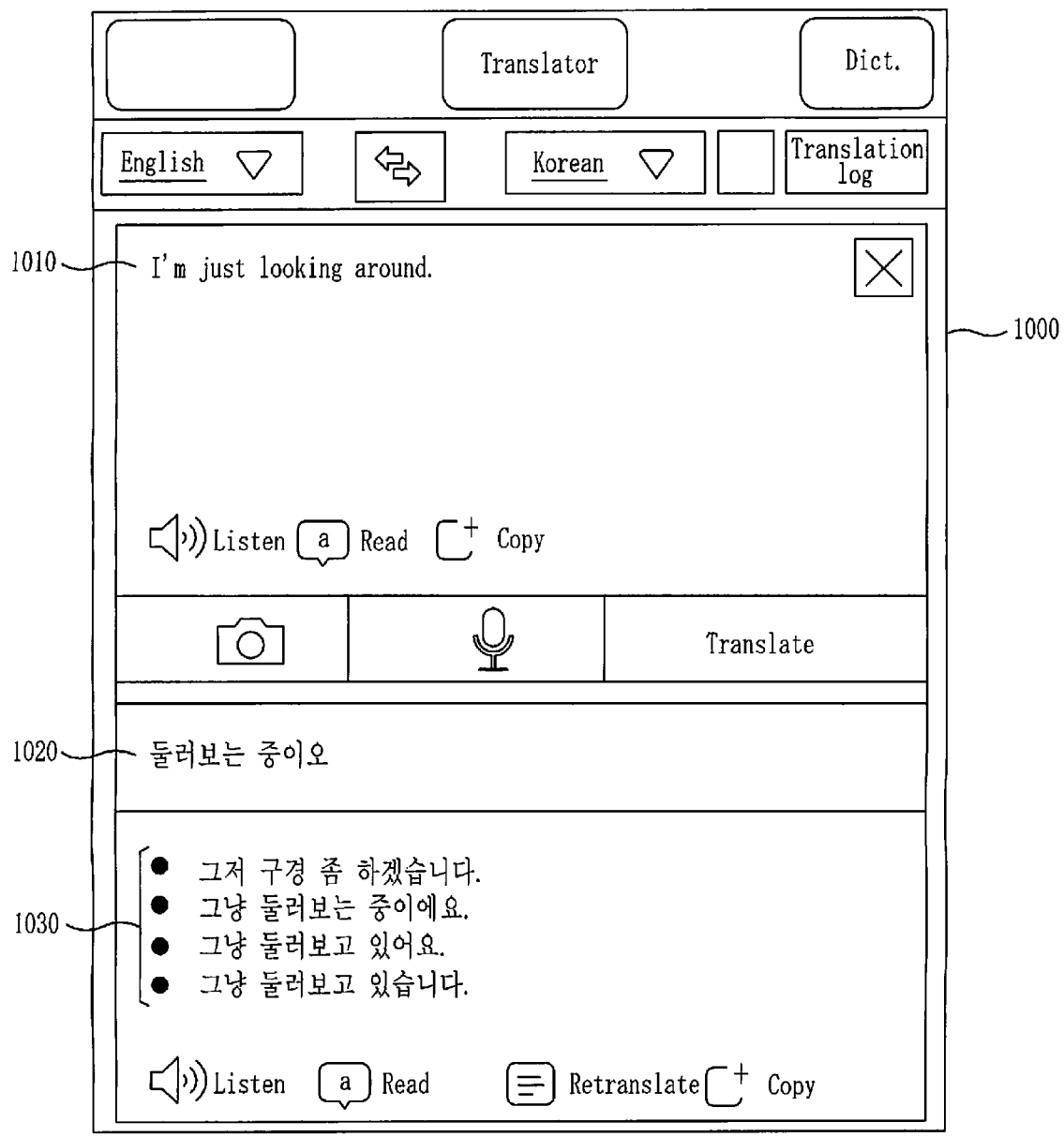

FIG. 10 illustrates an example of a translation result screen 1000 for translating English to Korean according to an example embodiment. A machine translation system may display translations 1020 and 1030 translated in Korean as a translation result, in response to a source sentence "I'm just looking around." 1010 in English. Here, as a translation result for the source sentence "I'm just looking around" 1010, the machine translation system may classify and thereby display the translation 1020 corresponding to an optimal sentence (e.g., "둘러보는 중이오." having the highest scores) and the translations 1030 corresponding to candidate sentences (e.g., "그저 구경 좀 하겠습니다", "그냥 둘러보는 중이에요.", "그냥 둘러보고 있어요.", and the like), which have same or similar meanings to "둘러보는 중이오."

Figure 11:
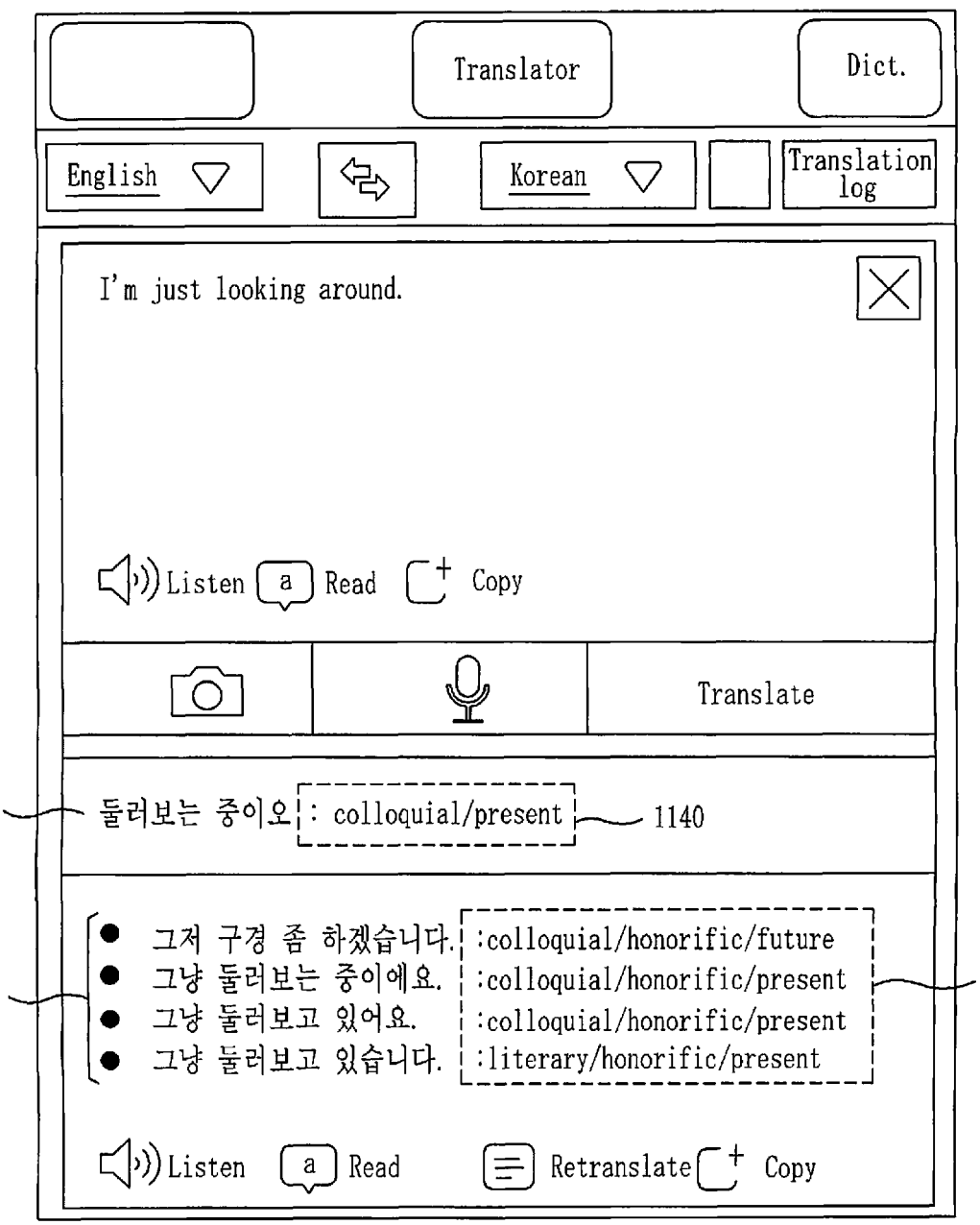

In particular, the machine translation system may classify and display sentences included in the translation result for respective semantic categories. For example, the semantic categories may indicate criteria for classifying attributes of the sentences, such as a writing style (e.g., a literary style and a colloquial style), a sentence structure (e.g., a declarative sentence, a pleasant sentence, an imperative sentence, a honorific form, and a plain form), a tense (e.g., a past tense, a present tense, and a future tense), and a linguistic norm (e.g., a standard language and a dialect). As an example, referring to FIG. 11, the machine translation system may display corresponding semantic categories 1140 to be adjacent to sentences 1120 and 1130 included in the translation result.

Figure 12:
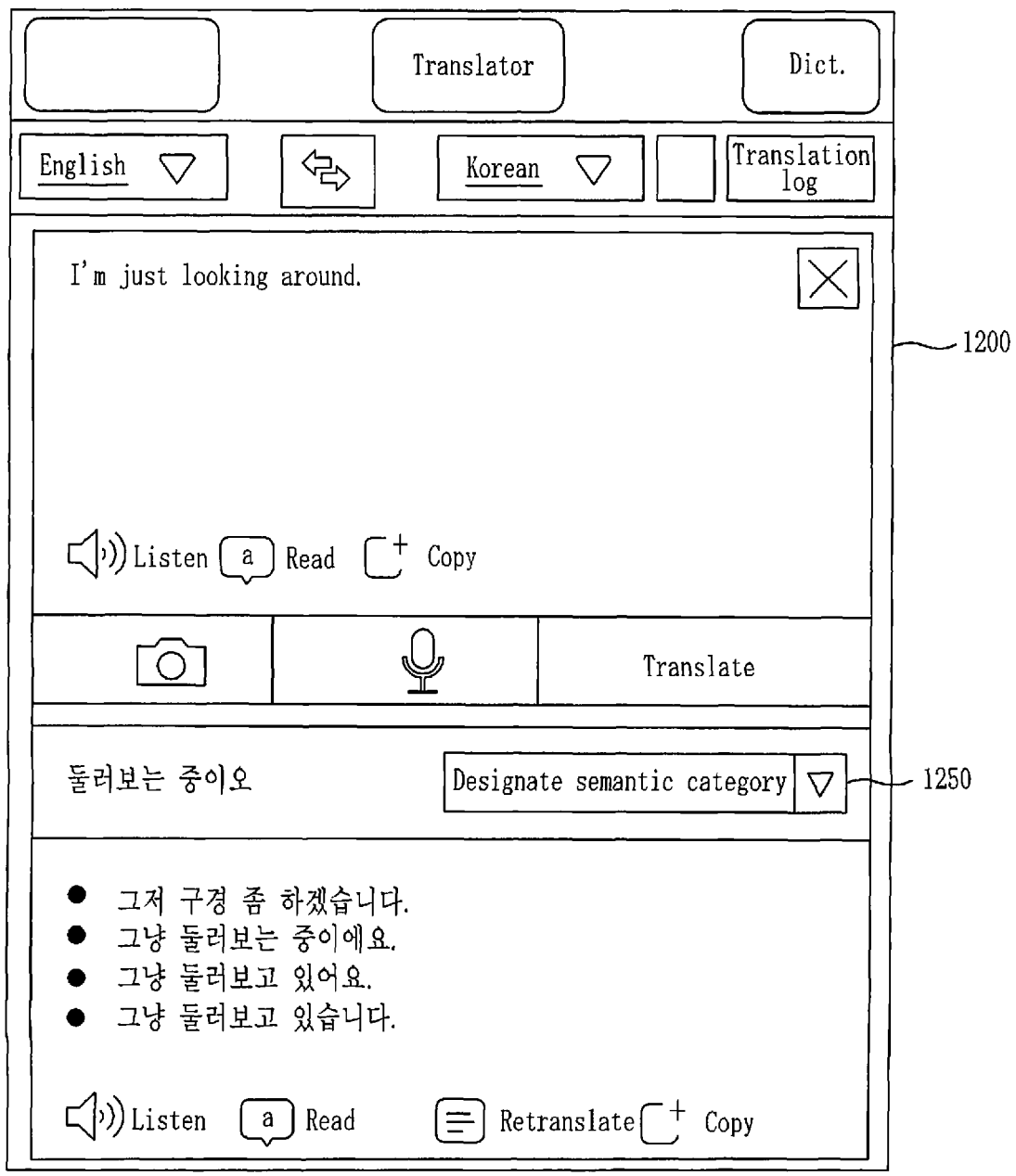

As another example, the machine translation system may display a candidate sentence suitable for a semantic category selected by a user as a translation result. For example, the machine translation system may display only a specific candidate sentence corresponding to a specific semantic category selected by the user, among a plurality of candidate sentences or may display the plurality of candidate sentences in a way that the specific candidate sentence corresponding to the specific semantic category selected by the user may be distinguished from among the plurality of candidate sentences. For example, referring to FIG. 12, a menu environment 1250 capable of designating a semantic category of a translation that the user desires to receive may be displayed at a desired (or alternatively, predetermined) location of a translation result screen 1200. Accordingly, the machine translation system may receive a selection of a user on a semantic category through the menu environment 1250 and then may select and display a specific candidate sentence classified into the selected semantic category. Further, the machine translation system may be configured to include a semantic category selecting path, which may be provided by setting an environment of a translator such that a pop-up button or window is displayed to request or prompt a selection of a semantic category in response to an input of a source sentence or such that a specific category is pre-set.

Further, although a user does not select a desired (or alternatively, predetermined) semantic category every time, the machine translation system may predict and automatically set a semantic category of a translation that the user is highly likely to desire to receive, based on information regarding a personality of the user. For example, the personality of the user may be analyzable based on user information on the Internet. For example, a semantic category of a sentence suitable for the personality of the user may be set by analyzing, for example, news articles, internet cafes, web blogs, and/or messengers, frequently used by the user, or a writing style frequently used by the user. That is, a sentence inclination of the user may be automatically applied when displaying a translation result by analyzing a sentence inclination frequently used by the user.

Also, when a source sentence is input from a user, the machine translation system may automatically classify a semantic category of the source sentence based on a writing style or a sentence structure of the source sentence, and may display a candidate sentence of which a semantic category is the same as or similar to the semantic category of the source sentence, among candidate sentences translated from the source sentence, to be distinguished from other candidate sentences. For example, when a semantic category of a source sentence is classified into a colloquial style and a honorific form, a sentence of which a writhing style and a sentence structure are classified into a colloquial style and a honorific form, may be displayed as a translation result among candidate sentences translated from the source sentence.

The aforementioned machine translation method may include at least two operations (e.g., one operation associated with a bilingual translation model and another operation associated with a monolingual language model) based on a detailed description of the machine translation system described above with reference to FIGS. 3 through 12.

The methods according to example embodiments may be recorded in non-transitory computer-readable media in a form of a program instruction executable through various computer systems.

A program associated with an input of a source sentence and an output of a translation in the machine translation method according to the example embodiments may be configured as a PC-based program or an application exclusive for a mobile terminal. A machine translation application (App) according to the example embodiments may be configured as an independently operating program or an in-app form of a desired (or alternatively, predetermined) application, for example, a search program to be operable on the desired (or alternatively, predetermined) application.

Also, the methods according to the example embodiments may be performed in such a manner that an application associated with a server system to provide a translation service controls a user terminal. As an example, the application may include a module configured to receive, from a user, a source sentence or a selection on a semantic category of a translation that the user desires to receive, and to transfer the received source sentence or semantic category to a server system, and a module configured to output a translation received from the server system. Also, the application may be installed in the user terminal through a file provided from a file distribution system. As an example, the file distribution system may include a file transmitter (not shown) configured to transmit the file in response to a request of the user terminal.

As described above, according to example embodiments, it is possible to provide a candidate sentence to substitute a translation of a source sentence as a sentence in a complete form, to classify and display a candidate translation sentence included in a translation result based on a semantic category, and particularly, to select and provide a translation of a semantic category suitable for the purpose or personality of a user.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described example embodiments.

It will be apparent to those skilled in the art that various modifications and variation can be made in the example embodiments without departing from the spirit or scope of which is defined by the claims and their equivalents.

What is claimed is:

1. A translation result providing method using a computer, the method comprising:
    generating, by a processor, candidate translation sentences by translating a source sentence of a source language into a target language using at least one of a rule-based machine translation model or a statistics-based machine translation model;
    classifying, by the processor, the candidate translation sentences into semantic categories, respectively, based on a condition related to attributes of the candidate translation sentences, the attributes including at least one of a writing style, a mood, a tense, or linguistic norm; and
    providing, by the processor, at least one of the classified candidate translation sentences as a translation result,
    wherein the providing includes displaying a first classified candidate translation sentence, from among the classified candidate translation sentences, which satisfies the condition in a first region of a screen and displaying a second classified candidate translation sentence, from among the classified candidate translation sentences, which does not satisfy the condition in a second region of the screen, and
    the first region and the second region are visually distinguished from each other on the screen.

2. The method of claim 1, wherein
    the classifying includes
        sorting the candidate translation sentences in order of scores, the scores measured using a machine translation model, and
        extracting two or more of the candidate translation sentences having relatively high scores, and
    the providing includes displaying the two or more of the candidate translation sentences as the translation result such that one of the two or more of the candidate translation sentences having highest scores is distinguished from the rest of the two or more of the candidate translation sentences.

3. The method of claim 1, wherein the providing includes displaying the translation result with respect to the semantic categories, respectively.

4. The method of claim 1, further comprising:
    receiving a selection of a user on one of the semantic categories with respect to the translation result,
    wherein the providing includes displaying one of the candidate translation sentences classified into one of the semantic categories selected by the user as the translation result.

5. The method of claim 1, further comprising:
    analyzing a sentence personality of a user who generated the source sentence,
    wherein the providing includes displaying one of the candidate translation sentences classified into one of the semantic categories as the translation result, the one of the semantic categories being a semantic category corresponding to the sentence personality of the user from among the semantic categories.

6. The method of claim 1, further comprising:
    classifying the source sentence into one of the semantic categories,
    wherein the providing includes displaying a candidate translation sentence classified into one of the semantic categories from among the classified result of the candidate translation sentences as the translation result.

7. A translation result providing system, comprising:
    a memory in which at least one program is loaded; and
    at least one processor configured to execute the at least one program such that the at least one processor is configured to perform processes including,
        generating candidate sentences by translating a source sentence of a source language into a target language based on at least one of a rule-based machine translation model or a statistics-based machine translation model,
        classifying the candidate sentences into semantic categories, respectively, based on a condition related to attributes of the candidate sentences, the attributes including at least one of a writing style, a mood, a tense, or linguistic norm, and
        providing at least one of the classified candidate sentences as a translation result such that a first classified candidate translation sentence, from among the classified candidate translation sentences, which satisfies the condition is displayed in a first region of a screen and a second classified candidate translation sentence, from among the classified candidate translation sentences, which does not satisfy the condition is displayed in a second region of the screen visually distinguished from the first region of the screen.

8. The translation result providing system of claim 7, wherein:
the classifying includes,
sorting the candidate sentences translated in order of scores measured using a machine translation model, and
extracting two or more of the candidate sentences having relatively high scores, and
the providing includes displaying the extracted two or more of the candidate sentences as the translation result such that displaying one of the extracted two or more candidate sentences having highest scores is distinguished among the extracted two or more of the candidate sentences.

9. The translation result providing system of claim 7, wherein the providing includes classifying and displaying the at least one of the classified candidate sentences for the semantic categories when the candidate sentences are generated from the source sentence.

10. The translation result providing system of claim 7, wherein the at least one processor is further configured to perform receiving a selection of a user on one of the semantic categories with respect to the translation result, and
wherein the providing includes displaying one of the at least one of the classified candidate sentences classified into one of the semantic categories selected by the user as the translation result.

11. The translation result providing system of claim 7, wherein, according to a control of the at least one program, the at least one processor is further configured to perform analyzing a sentence personality of a user who have generated the source sentence, and
wherein the providing includes displaying one of the at least one of the classified candidate sentences classified into one of the semantic categories corresponding to the sentence personality of the user as the translation result.

12. The translation result providing system of claim 7, wherein according to a control of the at least one program, the at least one processor is further configured to perform classifying the source sentence into one of the semantic categories, and
wherein the providing includes displaying one of the at least one of the classified candidate sentences classified into one of the semantic categories, which is identical or similar to the one of the semantic categories into which the source sentence is classified, as the translation result.

13. Non-transitory computer-readable recording media storing instructions to control a computer system to provide a translation result, wherein the instructions when executed configure the computer system to perform operations including,
generating translations by translating a source sentence of a source language into a target language based on at least one of a rule-based machine translation model or a statistics-based machine translation model;
classifying the translations into semantic categories, respectively, based on a condition related to attributes of the translations, the attributes including at least one of a writing style, a mood, a tense, or a linguistic norm; and
providing at least one of the classified translations as a translation result such that a first classified candidate translation sentence, from among the classified candidate translation sentences, which satisfies the condition is displayed in a first region of a screen, and a second classified candidate translation sentence, from among the classified candidate translation sentences, which does not satisfy the condition is displayed in a second region of the screen, the second region of the screen visually distinguished from the first region of the screen.

14. A file distribution system for distributing a file of an application to be installed in a user terminal,
a file distribution system configured to transmit the file in response to a request of the user terminal, and
the application, when executed by a processor, configured to,
control the user terminal to transmit a source sentence of a source language to a machine translation server,
the machine translation server configured to,
generate translations by translating a source sentence of a source language into a target language using at least one of a rule-based machine translation model or a statistics-based machine translation model,
classify the translations into semantic categories, respectively, based on a condition related to attributes of the translations, the attributes including at least one of a writing style, a mood, a tense, or linguistic norm, and
provide the classified translations to the user terminal, and
control the user terminal to display at least one of the classified translations as a translation result such that a first classified candidate translation sentence, from among the classified candidate translation sentences, which satisfies the condition is displayed in a first region of a screen, and a second classified candidate translation sentence, from among the classified candidate translation sentences, which does not satisfy the condition is displayed in a second region of the screen visually distinguished from the first region of the screen.

15. The method of claim 1, further comprising:
generating information regarding a personality of a user by analyzing user information on Internet; and
predicting and automatically setting a specific semantic category, from among the semantic categories, based on the analyzed user information.

16. The method of claim 1, wherein when the generating uses the statistics-based machine translation model, the method further includes a translation probability table constructing process, a translation probability table constructing process including,
receiving large translation pair data between the source language and the target language,
estimating translation probabilities between words from the large translation pair data,
determining a phrase section based on the estimated translation probability, and
constructing a translation probability table including candidate phrase data and respective ones of the estimated translation probabilities.

* * * * *